(12) United States Patent
Ross (10) Patent No.: US 8,678,313 B2
(45) Date of Patent: Mar. 25, 2014

(54) DOOR ENTRY HEAD GUARD

(75) Inventor: Pren B. Ross, Grant City, MO (US)

(73) Assignee: PB Ross Company, Grant City, MO (US)

( * ) Notice: Subject to any disclaimer, the term of this patent is extended or adjusted under 35 U.S.C. 154(b) by 340 days.

(21) Appl. No.: 13/083,744

(22) Filed: Apr. 11, 2011

(65) Prior Publication Data

US 2011/0253839 A1 Oct. 20, 2011

Related U.S. Application Data

(60) Provisional application No. 61/324,101, filed on Apr. 14, 2010.

(51) Int. Cl.
*B64C 1/10* (2006.01)

(52) U.S. Cl.
USPC ............... 244/121; 248/345.1; 244/118.5

(58) Field of Classification Search
USPC ........ 244/118.5, 121, 129.1, 137.2; 296/1.04; 248/345.1
See application file for complete search history.

(56) References Cited

U.S. PATENT DOCUMENTS

| 3,338,542 A * | 8/1967 | Meinhard ................. 248/345.1 |
| 5,437,071 A | 8/1995 | Feigenbaum |
| 5,496,609 A | 3/1996 | Michelstein |
| 6,357,187 B1 * | 3/2002 | Haldeman ..................... 52/211 |
| 7,618,698 B2 * | 11/2009 | Walters et al. .................. 428/99 |
| 2008/0164373 A1 | 7/2008 | Roming |
| 2011/0298237 A1 * | 12/2011 | Klein ........................... 296/1.04 |

OTHER PUBLICATIONS

PB Ross Company, PCT/US2011/031897, filed on Apr. 11, 2011 "The Internatioanl Search Report and the Written Opinion of the International Searching Authority, or the Declaration", mail date Jun. 21, 2011.

* cited by examiner

*Primary Examiner* — Philip J Bonzell
*Assistant Examiner* — Timothy Schwarz
(74) *Attorney, Agent, or Firm* — McKee, Voorhees & Sease, P.L.C.

(57) ABSTRACT

A method of protecting individuals entering or exiting an aircraft is provided. The method includes prior to the individuals entering or exiting the aircraft, removably attaching an entryway head guard to a frame of an entryway of the aircraft to protect the individuals entering or exiting the aircraft, the entryway head guard comprising a main body made of a protective material, wherein the main body has a contour that complements the frame of the aircraft passenger entryway such that the entryway head guard is configured to fit against the frame. The method further provides that after the individuals enter or exit the aircraft, removing the entryway head guard from the door of the aircraft.

11 Claims, 8 Drawing Sheets

DOOR ENTRY HEAD GUARD

CROSS-REFERENCE TO RELATED APPLICATIONS

This application claims priority under 35 U.S.C. §119 to provisional application Ser. No. 61/324,101 filed Apr. 14, 2010, herein incorporated by reference in its entirety.

FIELD OF THE INVENTION

The present invention relates to airplane passenger safety. More particularly, but not exclusively, the present invention relates to protecting passengers entering or exiting airplanes.

BACKGROUND OF THE ART

The Commercial and Regional Airlines and the Airport Authority have been, and continue to be, legally responsible for multiple head injuries every year. There are various contributing factors to these injuries.

One contributing factor is that the height of today's average person is 5'10" for males and 5'4" for females. The height of regional aircraft entry doors are less than 5'10" to less than 5'2". Yet there are still further complications. During the loading and offloading of passengers on regional jets is commonly done on airport tarmacs by the use of air stairs. The use of air stairs requires a passenger (who may be carrying a laptop and a carry-on bag) to ascend the stairs looking downward to focus on the narrow, steep steps while trying to hold onto the loose-fitting hand rails. When passengers get to the top of the steps they straighten up from the slouched position and step forward. It is then passengers repeatedly have a collision with the top of the main cabin entranceway with the top of their heads or their foreheads on the hardened sharp shell of the aircraft.

An additional concern, along with the aforementioned accident, is the occurrence of passengers losing their balance after striking their foreheads or craniums. The first natural reaction is to close one's eyes and take an immediate step backwards from the collision point. This provides an even greater risk of injury by either falling back down the steps or falling into passengers trying to load at the same time. During offload, passengers who strike their heads either collapse or trip forward into other passengers descending the steep and narrow steps. Each situation often leads to injuries to other passengers during the loading and offloading process.

Another factor to introduce into the loading and offloading process, is the height of the aircraft in relation to the unattached jet bridge. Very few jet bridge designs are built to squat down to the lower height of a regional passenger jet to connect correctly and level to the aircraft main cabin entryway. When the jet bridge is dropped to its lowest point, it is still necessary for the gate agent to put a connecting ramp (bridge), with a high degree of curvature, for passengers to cross over. Depending on the angle and height of the jet bridge, this can create more than a six inch in height difference above the level of the base of the entryway frame, which the passenger or crewmember is not aware of due to the illusion that he or she is descending from the jet bridge into the entryway. This puts the average 5'10" person's head at a 6'1" to 6'6" height, well above the level of the door entryway which is less than 5'10," and places passengers, once again, in a situation in which they repeatedly strike their heads, causing injury. These head injuries also continue to take place since the passengers' and crewmembers' primary focal point is always downward on the narrow, loose and unsecure bridge.

Head injuries are of course serious matters in and of themselves, but one person's head injuries creates critical concerns for others. After a passenger or crewmember has struck the top of the entryway with his or her head, another major concern is the bio-hazard caused by an open wound in a public place. There are twenty-nine life threatening Airborne Pathogens according to OSHA; HIV, tuberculosis, pneumonic plague, hepatitis, pneumonia, and diphtheria are just a few that can be spread with just the smallest open wound. The threat of airborne pathogens is the most efficient method by which pathogens can increase contact to a large number of passengers and the general public swiftly. Route efficiency of transmission is one of the most important characteristics that should be considered when evaluating how large an impact infectious diseases can have on the general public. Pathogens are often spread rapidly in public when airborne due to an open wound. Thus, whenever there is a bleeding head injury, there are potential health risks to others.

Aside from these problems, there is the issue of legal liability. Under Negligence Law, the defendant must use reasonable care to prevent harm to others. Negligence is defined as the failure to use reasonable care to prevent harm. Common carrier law definition requires the commercial and regional airlines to have the highest care and the vigilance of a very cautious person. In fact, the common carrier must do all that human care, vigilance, and foresight can do under the circumstances to avoid harm to passengers or property. If an airline or airport authority notices an unsafe area but failed to inform passengers, the airline and airport authority may be liable under a negligence theory of liability.

The Common Carrier Standard generally provides for a heightened duty of care. Commercial and Regional Airlines fall into a legal category called "common carriers"—entities that transport the general public for a fee. Common carriers must act with a high degree of care and use the vigilance of a very cautious person in order to protect passengers from any potential harm. This standard of care extends to the airline's employees as well (including pilots, flight attendants, ground crew, maintenance workers and the airline's own FAA safety inspectors). Common carriers also owe this heightened duty of care to passengers while they are boarding the plane, traveling onboard the aircraft, and getting off the plane. Once the passengers disembark, however, the airline is no longer legally responsible and the degree of care is now the legal responsibility of the airport authority. Some accidents may have several causes.

Thus, an array of legal issues may be created when an injury occurs for the airlines, airline insurance companies, airport authorities, or others. Yet another legal concern relates to workers compensation claims for airline employees, airport employees and airline crewmembers who are injured. Thus, there are significant legal issues which may be encountered when an individual is injured.

Therefore, what is needed is method and apparatus for protecting passengers from injury associated with the loading and offloading process and reducing legal risks associated with the occurrence of injuries in the loading and offloading process.

SUMMARY OF THE INVENTION

Therefore, it is a primary object, feature, or advantage of the present invention to provide for protecting passengers from injuries associated with loading and unloading from airplanes.

It is a further object, feature, or advantage of the present invention to provide a protective head guard that is convenient to put in place and to remove.

A still further object, feature, or advantage of the present invention is to protect air carriers and airports from legal liabilities associated with head injuries by passengers and crew members.

One or more of these and/or other objects, features, or advantages of the present invention will become apparent from the specification and claims that follow. No single embodiment need exhibit each and every object, feature, or advantage described herein as different embodiments and different aspects of the invention may have different objects, features, or advantages.

According to one aspect of the present invention, a method of protecting individuals entering or exiting an aircraft is provided. The method includes prior to the individuals entering or exiting the aircraft, removably attaching an entryway head guard to a top portion of a frame of an entryway of the aircraft to protect the individuals entering or exiting the aircraft, the entryway head guard comprising a main body made of a protective material, wherein the main body has a contour that complements the top portion of the frame of the aircraft passenger entryway such that the entryway head guard is configured to fit against the frame. After the individuals enter or exit the aircraft, the method provides for removing the entryway head guard from the entryway of the aircraft.

According to another aspect of the present invention, an entryway head guard for an aircraft entryway having a frame and being associated with an aircraft door is provided. The head guard includes a main body having a central portion comprised of padding and first and second ends and an exterior cover wrapped around the main body. The main body has a shape such that the central portion of the main body fits to the frame of the aircraft entryway to cover a top portion of the frame to protect individuals entering or exiting the aircraft through the door.

According to another aspect of the present invention, a method of protecting individuals entering or exiting an aircraft is provided. The method provides that prior to the individuals entering or exiting the aircraft, removably attaching an entryway head guard to a frame for an entryway of the aircraft to protect the individuals entering or exiting the aircraft, the entryway head guard comprising a main body having a central portion comprised of padding and first and second ends, an exterior cover wrapped around the main body, wherein the main body has a shape such that the central portion of the main body fits to the frame of the aircraft entryway to cover a top portion of the frame to protect individuals entering or exiting the aircraft through the door.

DETAILED DESCRIPTION OF THE PREFERRED EMBODIMENTS

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention generally provides a head protective device to be used on passenger, galley, cargo hold and service overhead passenger entryway of aircrafts. The device according to the present invention may, for example, be used on regional aircraft and commercial aircraft that fly under FAA certification. Of course, the present invention may be used on any number of types of aircraft.

The height of the average male is 5'10" and the height of the passenger aircraft entryways are less than 5'10". In addition, when the jet bridge is dropped to its lowest point, the gate agent still has to put a ramp down for the passengers to load or offload causing a 2 to 4 inch rise, which may place the passenger above the door entryway, causing the passenger to potentially hit his/her head and sustain injury. In addition, regional jets load and unload on the airport tarmacs. When doing so the passenger tends to be looking down, focusing on the narrow and steep steps, rather than on the overhead of the door entryway, which leads to the passengers potentially hitting their head.

The device, according to the present invention, may wrap around the hard metal (or composite material) of the door entryway of an aircraft and may prevent damage to the passengers' head upon entering and exiting the aircraft. The device may be attached and detached onto the door entryway by the aircraft personnel prior to passengers loading and unloading the aircraft.

The device of the present invention comprises a main body which may be made of pre-cast foam or other cushioning or impact absorbing material that is specifically designed to mold, adhere, or clamp around each passenger entry doorway overhead and service doorway overhead of an aircraft. In addition, the present invention may include an exterior cover that may be wrapped around the pre-cast foam pad frame forming a one piece device with or without any moving parts. All of the materials used by the present invention may be manufactured and assembled using FAA pre-certified products in accordance to FAA Regulations; FAR 25.853.

In one embodiment, the exterior cover may be custom tailored to include logo, color and customer requests for a specific airline; "welcome aboard", "caution", "watch your head", "thank you for your business", or anything the customer desires. The device may be fabricated from certified fireproof foam, faux leather, adhesive and thread. The device of the present invention may be attached to the aircraft via press fitting, magnetic, clamps, suction, Velcro, mold specific or latches.

Figure 1:
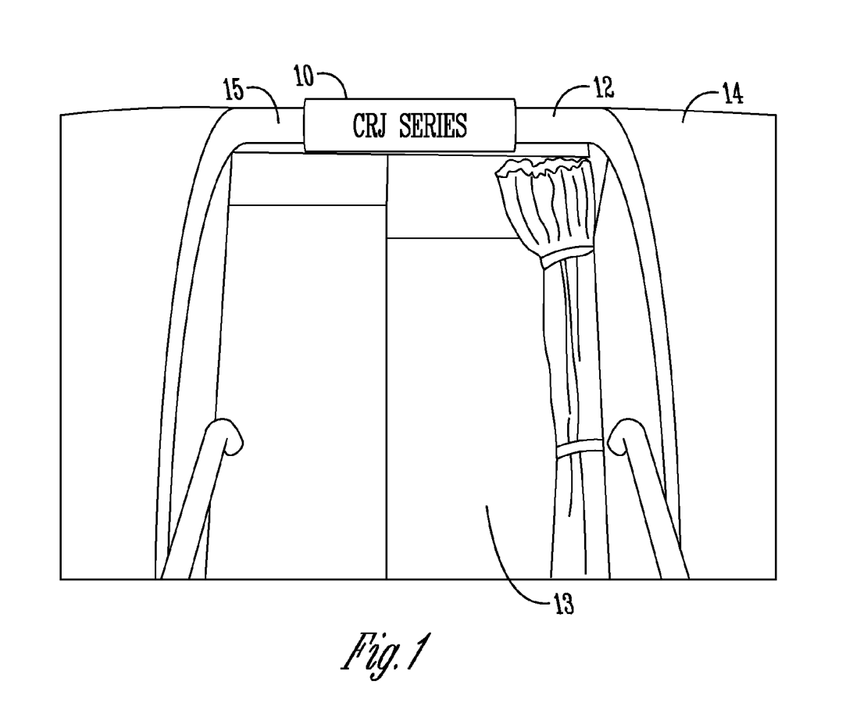
FIG. 1 illustrates one embodiment of the door entry head guard in an operative position of an aircraft.

FIG. 1 illustrates one embodiment of the door entry head guard in an operative position of an aircraft. In FIG. 1, the door entry head guard 10 is placed on the door entry frame 12 of an entryway 13 of an aircraft 14 to protect individuals entering or exiting the aircraft 14. The present invention may be used with any number of types of aircraft doorways, including without limitation, main cabin entryways, galley ways, cargo hold entryways or service doorways. As shown in FIG. 1, the door entry head guard 10 wraps around a top portion 15 of entryway 13.

Figure 2:
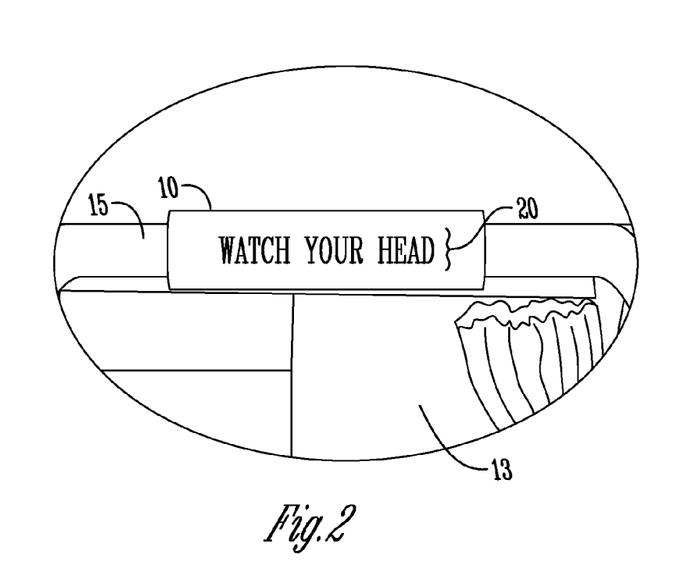
FIG. 2 illustrates an enlarged view of one embodiment of the door entry head guard in an operative position on an aircraft.

FIG. 2 illustrates an enlarged view of one embodiment of the door entry head guard in an operative position on an aircraft. Note that in FIG. 2, indicia 20 may be placed on the door entry head guard 10. The indicia 20 may include messages warning or cautioning individuals to watch their heads, warning or caution symbols, or other messages. For example, the indicia 20 may include the name, symbol, or slogan of an airline associated with the aircraft 14.

Figure 3:
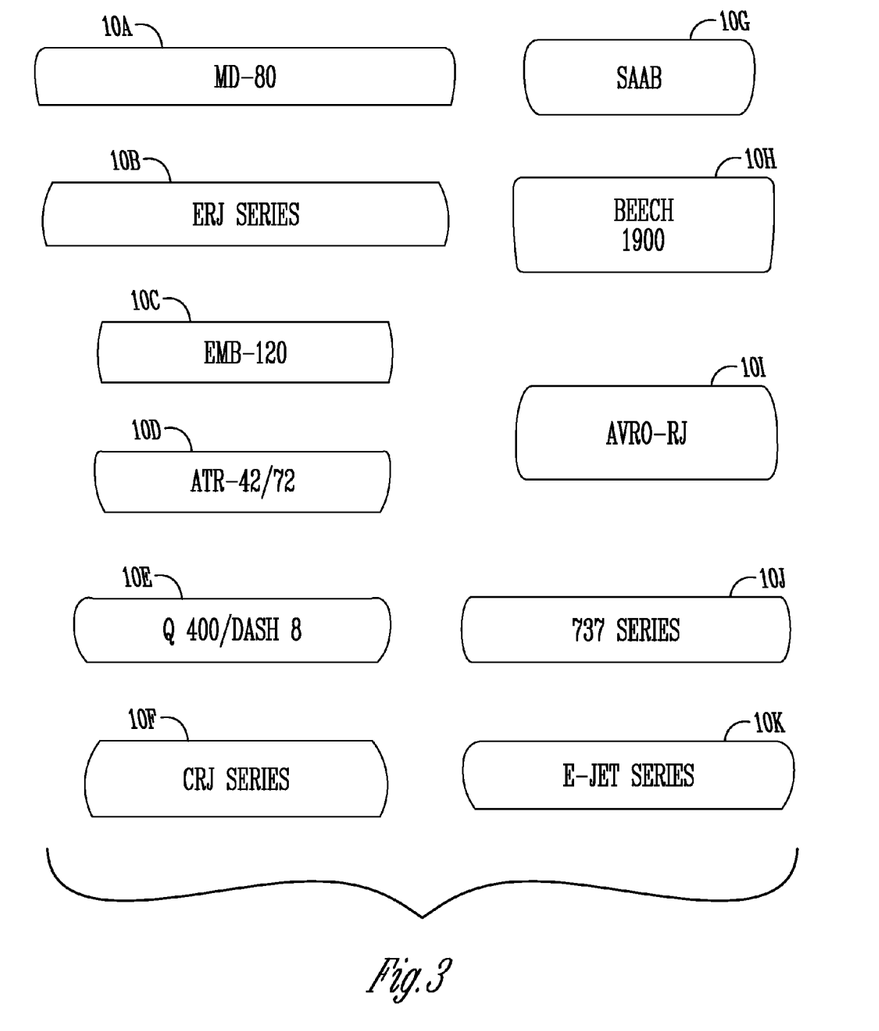
FIG. 3 illustrates examples of various sizes and shapes of the door entry head guard as may be used for different aircraft.

FIG. 3 illustrates examples of various sizes and shapes of the door entry head guard as may be used for different aircraft. The present invention contemplates numerous variations in the specific size and shape of the door entry head guard as may be appropriate to fit a specific model of aircraft. Although various sizes and shapes are shown in FIG. 3, one skilled in the art would appreciate that other sizes and shapes may be used.

As shown in FIG. 3, door entry head guard 10A is suitable for use on an MD-80 aircraft. Door entry head guard 10B is suitable for use on ERJ series aircraft. Door entry head guard 10C is suitable for use on EMB-120 aircraft. Door entry head guard 10D is suitable for use on ATR-42/72 aircraft. Door entry head guard 10E is suitable for use on Q400/Dash 8 aircraft. Door entry head guard 10F is suitable for use on CRJ Series aircraft. Door entry head guard 10G is suitable for use on SAAB aircraft. Door entry head guard 10H is suitable for use on Beech 1900 aircraft. Door entry head guard 10I is suitable for use on AVRO-RJ aircraft. Door entry head guard 10J is suitable for use on 737 series aircraft. Door entry head guard 10K is suitable for use on E-Jet series aircraft.

The present invention contemplates that the door entry head guard of the present invention may be configured as necessary to accommodate any number of types of aircraft including, but not limited to jets, jumbo jets, regional jets, airliners, regional airliners, helicopters, and other types of personal and commercial aircraft.

Figure 4:
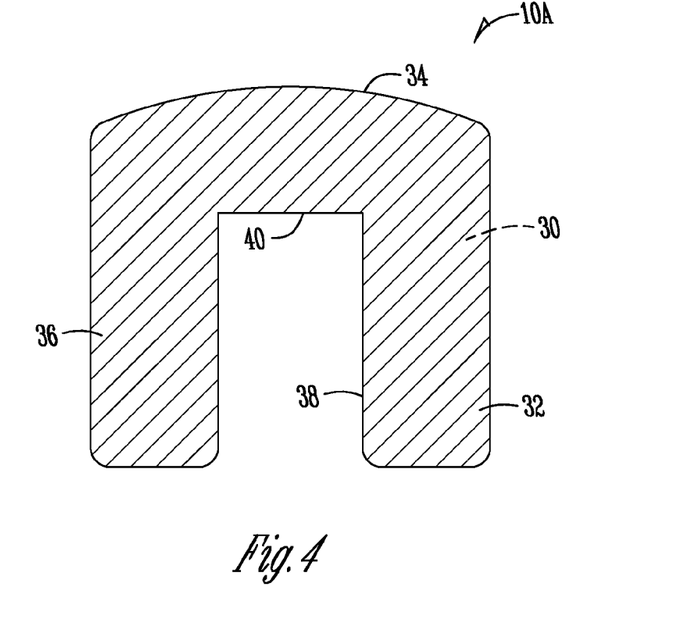
FIG. 4 illustrates an end view of one example of a door entry head guard sized and shaped for use with an MD80 airplane door.

FIG. 4 illustrates an end view of one example of a door entry head guard 10A sized and shaped for use with an MD80 airplane door. The door entry head guard 10A has a main body 30 which may be formed of a protective material which may be a pre-cast protective material such as foam. The main body 30 provides padding, cushioning, or impact absorption. An exterior cover 32 may be wrapped around the main body 30. The exterior cover 32 may be formed from any number of types of materials. The door entry head guard 10A has a central padded portion 34 with an inner portion 40 which is located between opposite ends 36,38. In operation, the ends 36, 38 are placed on opposite sides of portions of the door frame of the aircraft.

Figure 5:
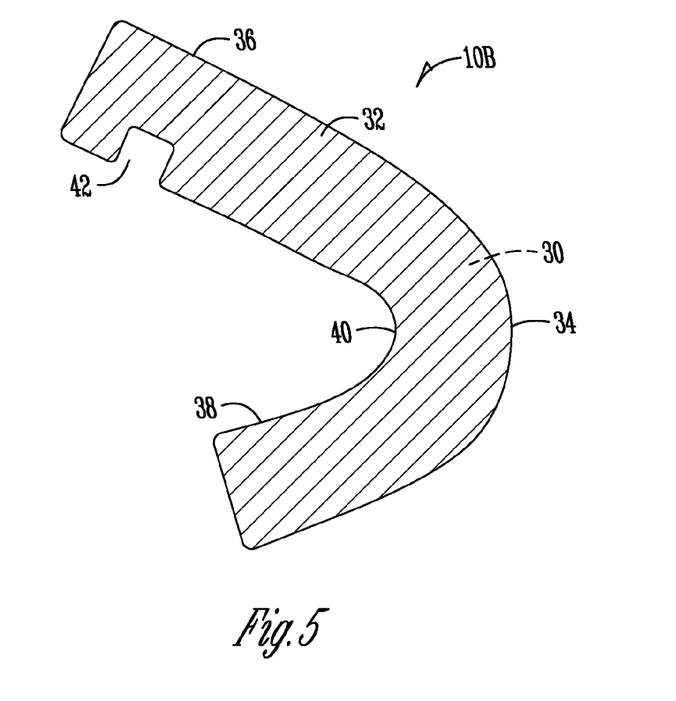
FIG. 5 illustrates one example of the door entry head guard sized and shaped for use with an ERJ-135 airplane door.

FIG. 5 illustrates one example of the door entry head guard sized and shaped for use with an ERJ-135 airplane door. Note that the main body 30 is sized and shaped differently than in FIG. 4. Also, in FIG. 4, there is a notch 42 in the end portion 36 of the door entry head guard 10B. The notch 42 facilitates fitting the door entry head guard to the door frame of the aircraft.

Figure 6:
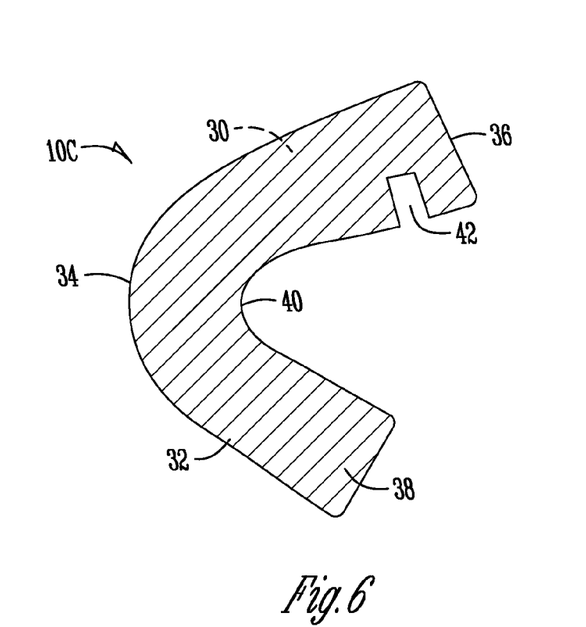
FIG. 6 illustrates one example of a door entry head guard sized and shaped for use with an EMB-120 airplane door.

FIG. 6 illustrates one example of a door entry head guard 10C sized and shaped for use with an EMB-120 airplane door. Note that in FIG. 6 there is a notch 42 which facilitates fitting the door entry head guard to the door frame of the aircraft.

Figure 7:
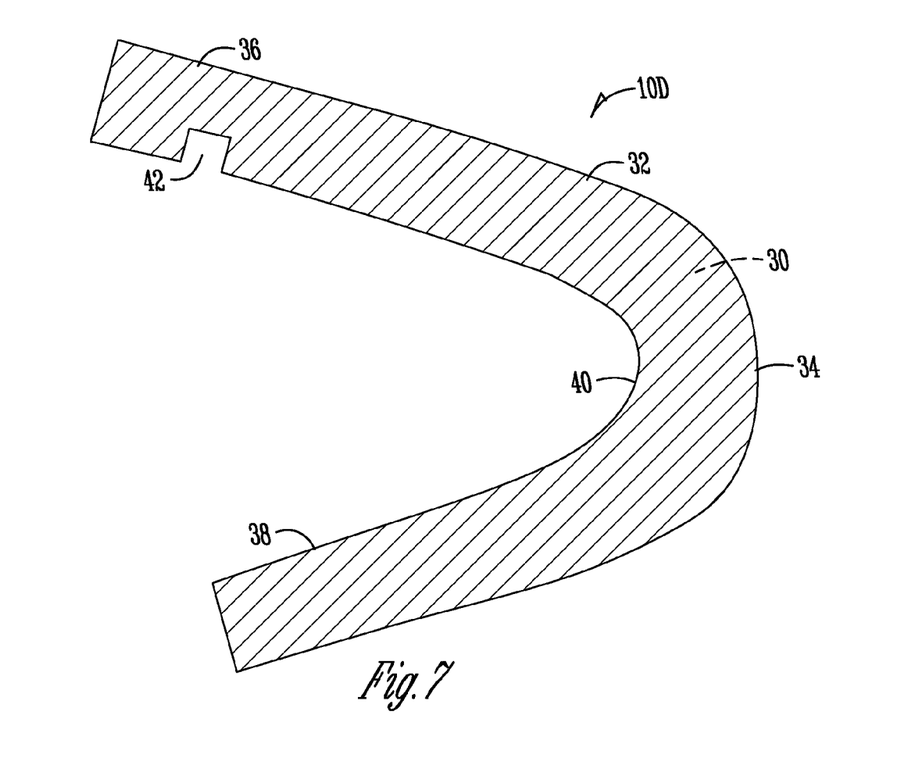
FIG. 7 illustrates one example of a door entry head guard sized and shaped for use with an ATR-42/72 airplane door.
Figure 8:
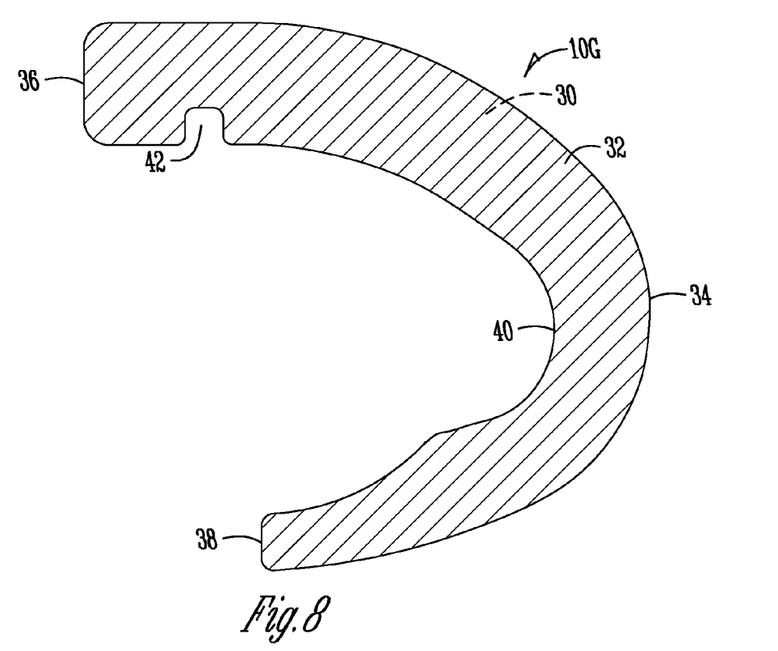
FIG. 8 illustrates one example of a door entry head guard sized and shaped for use with a SAAB airplane door.
Figure 9:
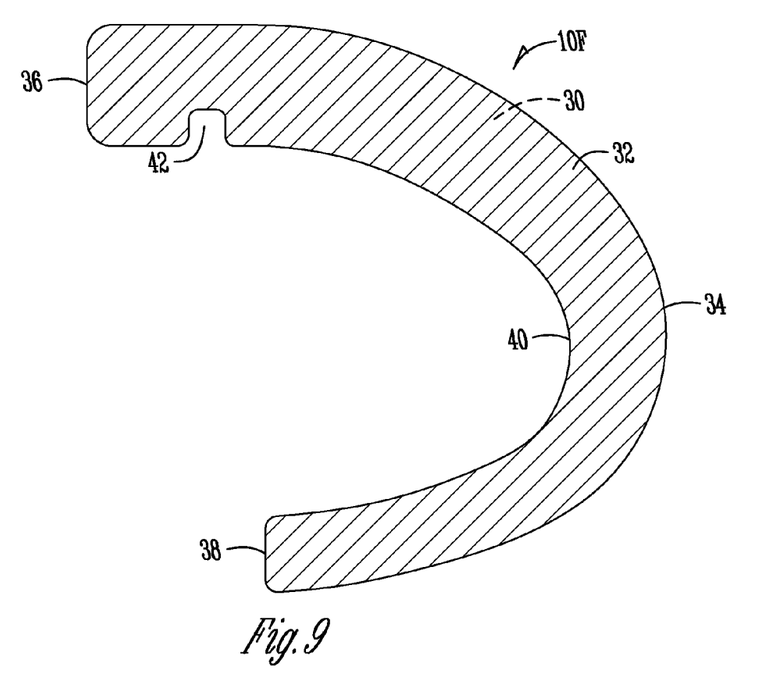
FIG. 9 illustrates one example of a door entry head guard sized and shaped for use with a CRJ-700 airplane door.
Figure 10:
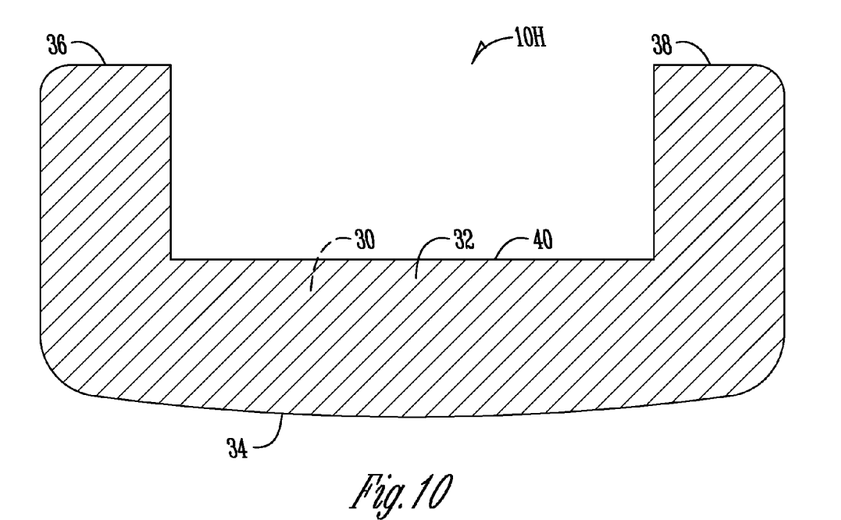
FIG. 10 illustrates one example of a door entry head guard sized and shaped for use with a BEECH 1900 airplane door.

FIG. 7 illustrates one example of a door entry head guard 10D sized and shaped for use with an ATR-42/72 airplane door frame. FIG. 8 illustrates one example of a door entry head guard 10G sized and shaped for use with a SAAB airplane door frame. FIG. 9 illustrates one example of a door entry head guard 10H sized and shaped for use with a CRJ-700 airplane door frame. FIG. 10 illustrates one example of a door entry head guard 10H sized and shaped for use with a BEECH 1900 airplane door frame.

Figure 11:
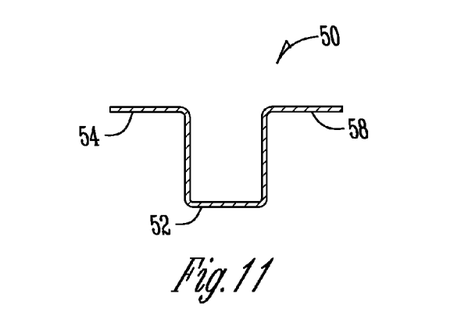
FIG. 11 illustrates a piece which may be placed on the frame of a door entry to allow the door entry head guard to be put in place.

In some uses the present invention provides for a better fit against the frame of an aircraft door through use of an additional adapting piece. One example of such an adapting piece is shown in FIG. 11. The piece 50 as shown includes a central portion 52 and an end portions 54, 58. The piece 50 may then fit into place over a portion of the frame of the aircraft entryway and then the door entry heard guard may in turn fit onto the piece. The piece 50 may be made from aluminum or other materials. Preferably the piece 50 is made from a rigid material.

Figure 12:
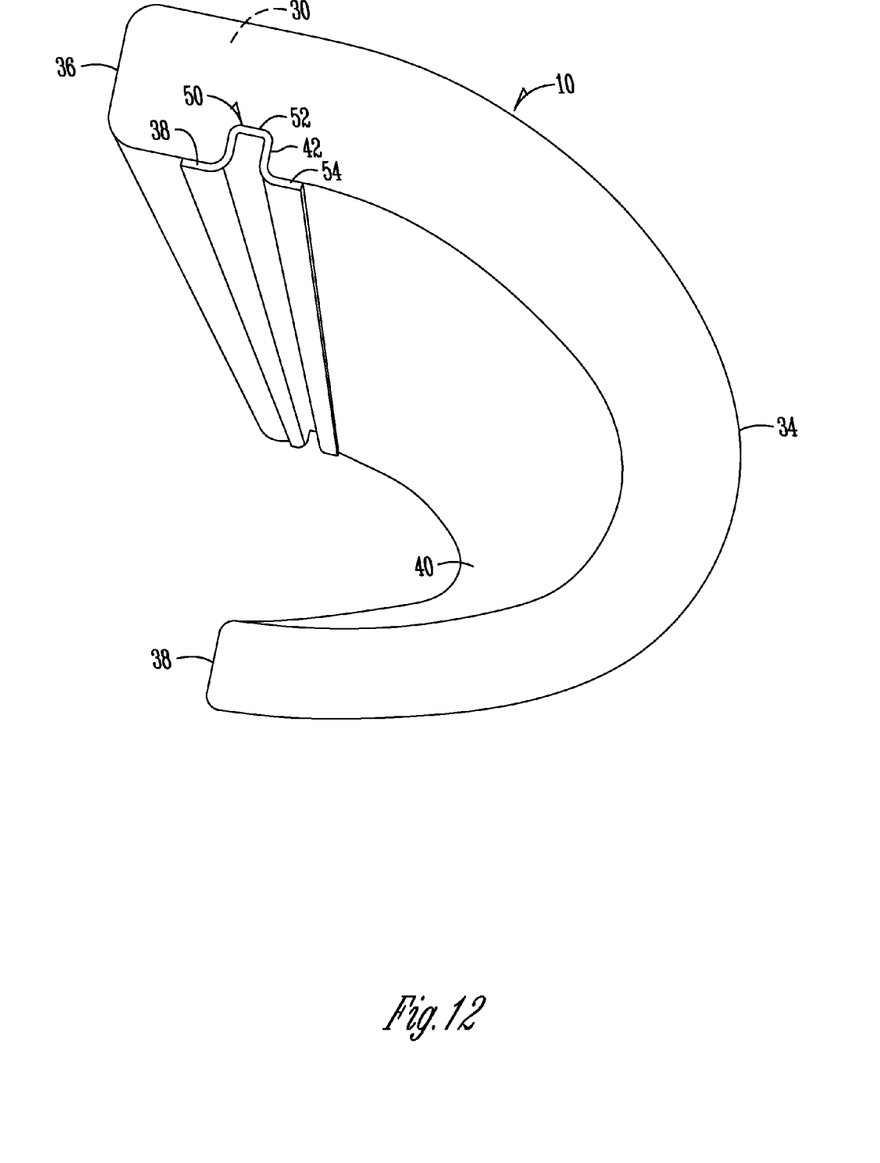
FIG. 12 illustrates a door entry head guard where an additional piece is used for removably connecting the door entry head guard to the frame of an entryway.

FIG. 12 illustrates one use of the adapting piece 50. As shown in FIG. 12, the adapting piece 50 is inserted within the notch 42 of the door entry head guard 10. The door entry guard 10 with the adapting piece 40 in place may then be fit to the frame of the aircraft entryway such as to a drip guard or other structure associated with the aircraft entryway. The piece 50 shown may be used with ERJ, CRJ, Saab, EMB120, ATR series, Q series, and Ejet series aircraft.

Figure 13:
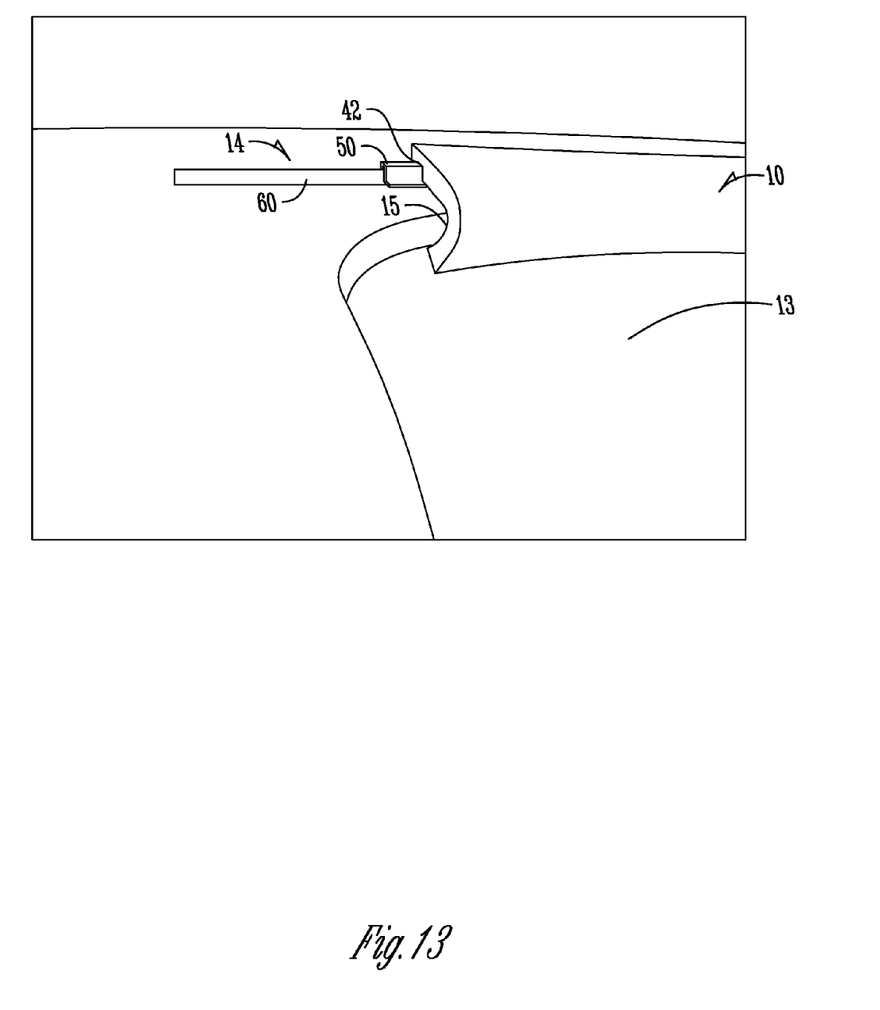
FIG. 13 illustrates a door entry head guard in an operative position on an aircraft where an additional rigid piece is used to connect the door entry head guard to a drip guard of the aircraft.

FIG. 13 illustrates the door entry head guard in an operative position on an aircraft where the adapting piece 50 is used. As shown in FIG. 13, the adapting piece 50 is disposed within the notch 42 of the door entry head guard 10. The door entry head guard 10 is in position over the entryway 13 through its fit against the drip guard 60 of the aircraft 14 and then down around the top frame 15 of the entryway 13. Note that the door entry head guard 10 has a form fitting contour that complements a top portion of the frame of the aircraft passenger entryway such that the entryway head guard is configured to fit against or around the top portion of the frame.

Various embodiments of the door entry head guard have been shown and described. In operation, when a door of an aircraft is opened, the door entry head guard may then be positioned at the door frame in a position which provides protections to individuals entering and/or exiting the aircraft. The door entry head guard may be snug fit or press fit into place with the padded portion of the door entry head guard typically covering those portions of the frame which a person would generally be most likely to hit. Therefore, the present invention is highly advantageous as it can reduce head injuries and the legal liability associated with negligence that result in head injuries.

It should be understood, of course, that the foregoing relates to exemplary embodiments of the invention and that modifications may be made without departing from the spirit and scope of the invention as set forth in the following claims. The present invention contemplates variations in the size and shape of the door entry head guard, the type of material used for the door entry head guard, and the type of aircraft with which the door entry head guard is used, the type of door opening. In addition, the present invention contemplates variations in the indicia, markings, symbols, names, slogans, or other markings placed on the door entry head guard. The present invention further contemplates variations in the manner in which the door entry head guard is fit against the entryway and other variations.

What is claimed is:

1. A method of protecting individuals entering or exiting an aircraft, the method comprising:
   prior to the individuals entering or exiting the aircraft, removably attaching an entryway head guard to a frame of an entryway of the aircraft to protect the individuals entering or exiting the aircraft, the entryway head guard comprising a main body made of a protective material, wherein the main body has a formfitting contour that complements a top portion of the frame of the aircraft passenger entryway such that the entryway head guard is configured to fit against the top portion of the frame; and
   after the individuals entering or exiting the aircraft, removing the entryway head guard from the entryway of the aircraft.

2. The method of claim 1 wherein the protective material is precast.

3. The method of claim 2 wherein the protective material is foam.

4. The method of claim 3 wherein the entryway head guard further comprises an exterior cover.

5. The method of claim 1. wherein he removably attaching comprises press fitting the entryway head guard against the frame of the aircraft passenger entryway.

6. The method of claim 1 wherein the aircraft is selected from a set consisting, or a jet, a regional jet, an airliner, a regional airliner, and a helicopter.

7. The method of claim 1 further comprising a notch in the main body and a rigid piece fitting within the notch to removably attach the entryway head guard to the entryway.

8. A method of protecting individuals entering or exiting an aircraft, the method comprising:
   prior to the individuals entering or exiting the aircraft, removably attaching an entryway head guard to a frame of an entryway of the aircraft to protect the individuals entering or exiting the aircraft, the entryway head guard comprising a main body having a central portion comprised of padding and first and second ends, an exterior cover wrapped around the main body, wherein the main body has a shape such that the central portion of the main body fits to the frame of the entryway to cover a top portion of the frame to protect individuals entering or exiting the aircraft through the door.

9. The method of claim 8 further comprising after the individuals entering or exiting the aircraft, removing the entryway head guard from the frame of die entryway of the aircraft.

10. The method of claim 8 wherein the entryway head guard is snug fit to a drip channel associated with the entryway.

11. The method of claim 8 further comprising inserting a rigid adapting piece into a notch of the entryway head guard.

* * * * *

UNITED STATES PATENT AND TRADEMARK OFFICE
CERTIFICATE OF CORRECTION

PATENT NO. : 8,678,313 B2 Page 1 of 1
APPLICATION NO. : 13/083744
DATED : March 25, 2014
INVENTOR(S) : Pren B. Ross It is certified that error appears in the above-identified patent and that said Letters Patent is hereby corrected as shown below:

In the Claims:

Col. 7, Claim 1, Line 17:
DELETE before contour "formfitting"
ADD before contour --form fitting--

Col. 7, Claim 5, Line 30:
DELETE after wherein "he"
ADD after wherein --the--

Col. 8, Claim 9, Line 22:
DELETE before entry of "die"
ADD before entry of --the--

Signed and Sealed this
Tenth Day of June, 2014

Michelle K. Lee
*Deputy Director of the United States Patent and Trademark Office*